(12) United States Patent
Ho

(10) Patent No.: US 8,069,822 B2
(45) Date of Patent: Dec. 6, 2011

(54) PET EXERCISE WHEEL ASSEMBLY HAVING LIGHT-EMITTING DEVICE

(75) Inventor: Ying-Kuan Ho, Tainan (TW)

(73) Assignee: Ying Yeeh Enterprise Co., Ltd., Tainan (TW)

( * ) Notice: Subject to any disclaimer, the term of this patent is extended or adjusted under 35 U.S.C. 154(b) by 74 days.

(21) Appl. No.: 12/652,778

(22) Filed: Jan. 6, 2010

(65) Prior Publication Data

US 2011/0162586 A1 Jul. 7, 2011

(51) Int. Cl.
*A01K 15/02* (2006.01)
(52) U.S. Cl. ........................................................ 119/700
(58) Field of Classification Search ............... 119/58, 119/59, 60, 61.1, 61.57, 421, 427, 452, 482, 119/700–704; 482/1–9, 14–19, 51, 54, 66, 482/68, 69, 78, 132, 148; 446/175, 219, 446/235, 236, 242, 247, 250, 484
See application file for complete search history.

(56) References Cited

U.S. PATENT DOCUMENTS

| | | | | |
|---|---|---|---|---|
| 1,794,951 A * | 3/1931 | Freer | | 119/700 |
| 2,681,040 A * | 6/1954 | Kniesteadt | | 119/452 |
| 3,057,328 A * | 10/1962 | Swartz | | 119/700 |
| 3,788,277 A * | 1/1974 | Willinger et al. | | 119/700 |
| 4,088,094 A * | 5/1978 | Howard | | 119/700 |
| 4,171,682 A * | 10/1979 | Merino et al. | | 119/475 |
| 5,125,361 A * | 6/1992 | Rowlands | | 119/700 |
| 5,649,503 A * | 7/1997 | Woolfolk | | 119/700 |
| 6,083,076 A * | 7/2000 | Saint-Victor | | 446/242 |
| 6,270,391 B1 * | 8/2001 | Emilsson | | 446/47 |
| D484,284 S * | 12/2003 | Venson et al. | | D30/160 |
| 6,668,759 B1 * | 12/2003 | Jaeger | | 119/700 |
| 7,037,169 B2 * | 5/2006 | Benedek et al. | | 446/242 |
| 7,299,767 B2 * | 11/2007 | Tominaga et al. | | 119/700 |
| 7,770,539 B1 * | 8/2010 | Zimmerman et al. | | 119/700 |
| 7,874,891 B2 * | 1/2011 | Van Dan Elzen et al. | | 446/250 |
| 2008/0141946 A1 * | 6/2008 | Kalani | | 119/700 |

FOREIGN PATENT DOCUMENTS

JP 2006288289 A * 10/2006
* cited by examiner

*Primary Examiner* — Rob Swiatek
*Assistant Examiner* — Ebony Evans
(74) *Attorney, Agent, or Firm* — Alan Kamrath; Kamrath & Associates PA

(57) ABSTRACT

A pet exercise wheel assembly having a light-emitting device includes an exercise wheel made of a material pervious to light. The exercise wheel has a tapered sleeve projecting from a center of the exercise wheel and is axially formed with a penetrating channel. A light-emitting device has a casing coupled to the tapered sleeve of the exercise wheel. The light-emitting device has a circuit board formed with a central hole and provided with at least a lamp, a battery, a rocker switch, and an IC chip that are electrically connected with each other, with the lamp exposed at an exterior of the casing. Thereby, rotation of the exercise wheel drives the light-emitting device to rotate, so that the rocker switch in the light-emitting device is rocked to close a loop of the circuit board, thus causing the lamp to blink and provide a visual entertaining effect.

2 Claims, 8 Drawing Sheets

PET EXERCISE WHEEL ASSEMBLY HAVING LIGHT-EMITTING DEVICE

BACKGROUND OF THE INVENTION

1. Technical Field

The present invention relates to a pet exercise wheel assembly having a light-emitting device. In the pet exercise wheel assembly, an exercise wheel is combined with a light-emitting device, so that when a pet runs in the exercise wheel, the rotation of the exercise wheel synchronously drives the light-emitting device to blink, thereby adding operation of the exercise wheel with visual pleasure.

2. Description of Related Art

With the increasingly growing tendency of raising pets, the market has more and more demands on pet cages for inhabitation of their treasured pets. Particularly, the rearers of those highly active, small pets such as hamsters and cavies are usually willing to acquire some exercise accessories, like stairs, treadmills, spring boards, and exercise wheels, for the pets to use and exercise thereby.

BRIEF SUMMARY OF THE INVENTION

The present invention thus provides a novel configuration of an exercise wheel which is attachable to a pet cage and which has an illumination effect.

The primary objective of the present invention is to provide a pet exercise wheel assembly having a light-emitting device. In the pet exercise wheel assembly, an exercise wheel, made of a material pervious to light, has a tapered sleeve projecting outward and inward from a center of the exercise wheel and axially formed with a penetrating channel. A light-emitting device has a casing coupled to the tapered sleeve of the exercise wheel by piercing the tapered sleeve through a central hole formed on the casing. The light-emitting device has a circuit board formed with a central hole and provided with at least a lamp, a battery, a rocker switch, and an IC chip that are electrically connected with each other, with the lamp exposed at an exterior of the casing. A screw portion of a wheel base pierces through the penetrating channel of the exercise wheel, and a cover cap is combined with the wheel base through internal threads and external threads formed thereon. Thereby, rotation of the exercise wheel drives the light-emitting device to rotate, so that the rocker switch in the light-emitting device is rocked to close a loop of the circuit board, thus causing the lamp to blink and provide a visual entertaining effect.

BRIEF DESCRIPTION OF THE SEVERAL VIEWS OF THE DRAWINGS

The invention as well as a preferred mode of use and advantages thereof will be best understood by referring to the following detailed description of the illustrative embodiment in conjunction with the accompanying drawings, wherein.

DETAILED DESCRIPTION OF THE INVENTION

Figure 1:
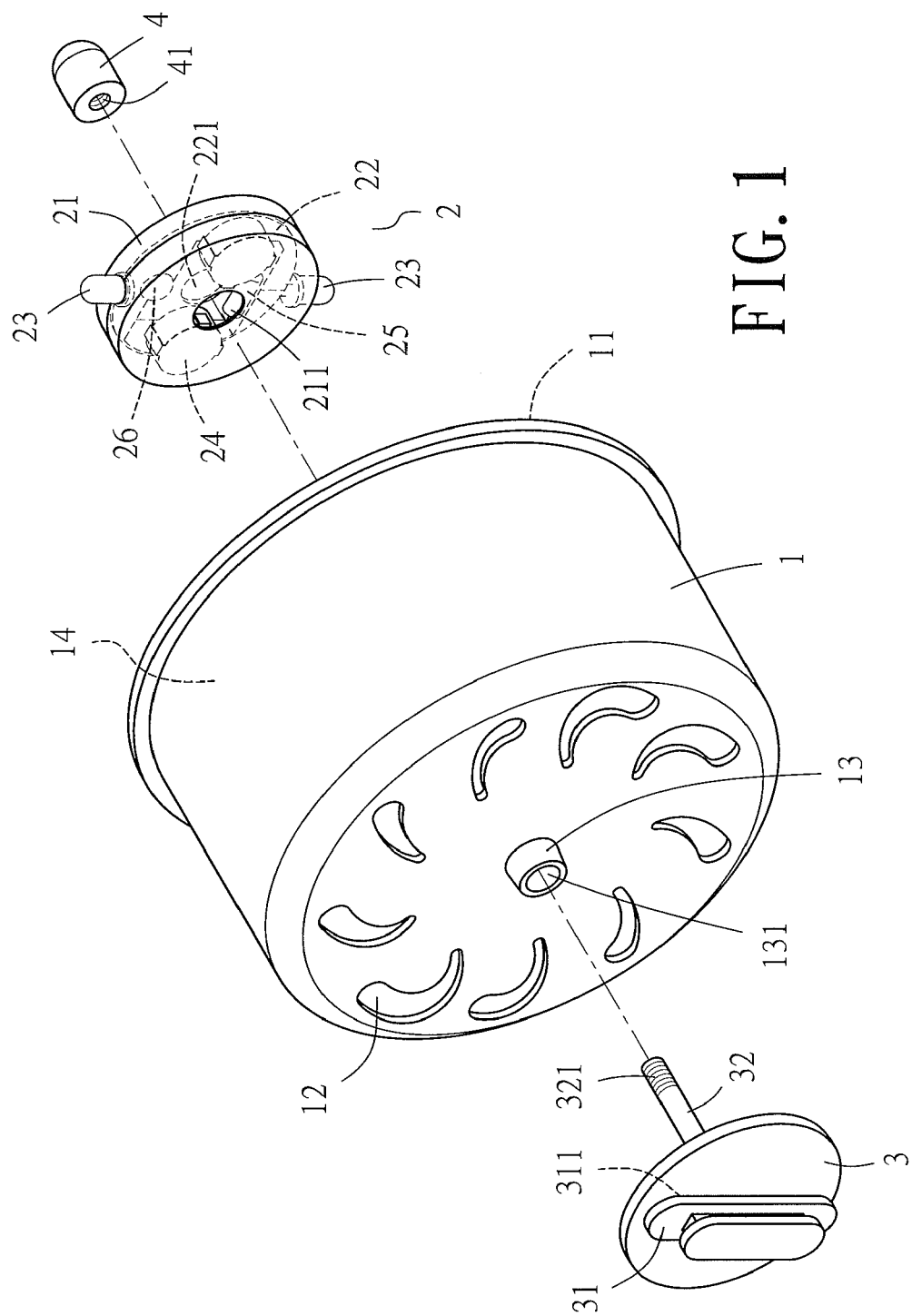
FIG. 1 is an exploded view of a pet exercise wheel assembly according to the present invention.
Figure 2:
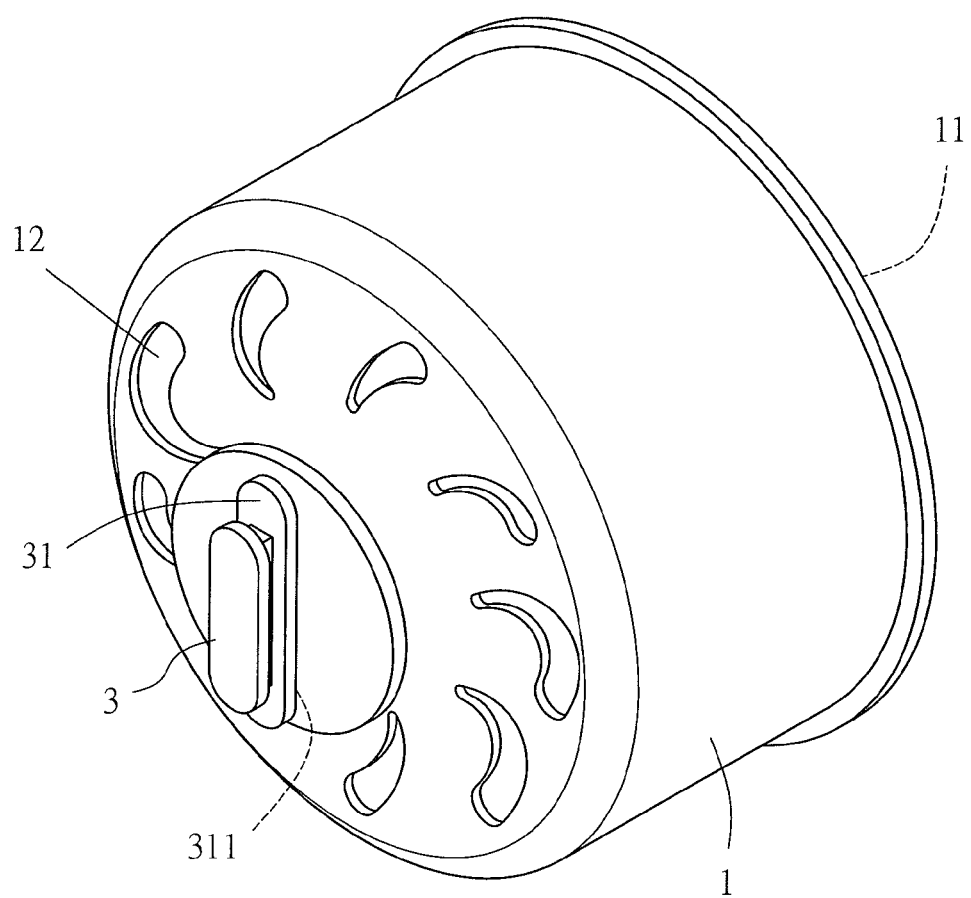
FIG. 2 is a perspective view of the pet exercise wheel assembly according to the present invention.
Figure 3:
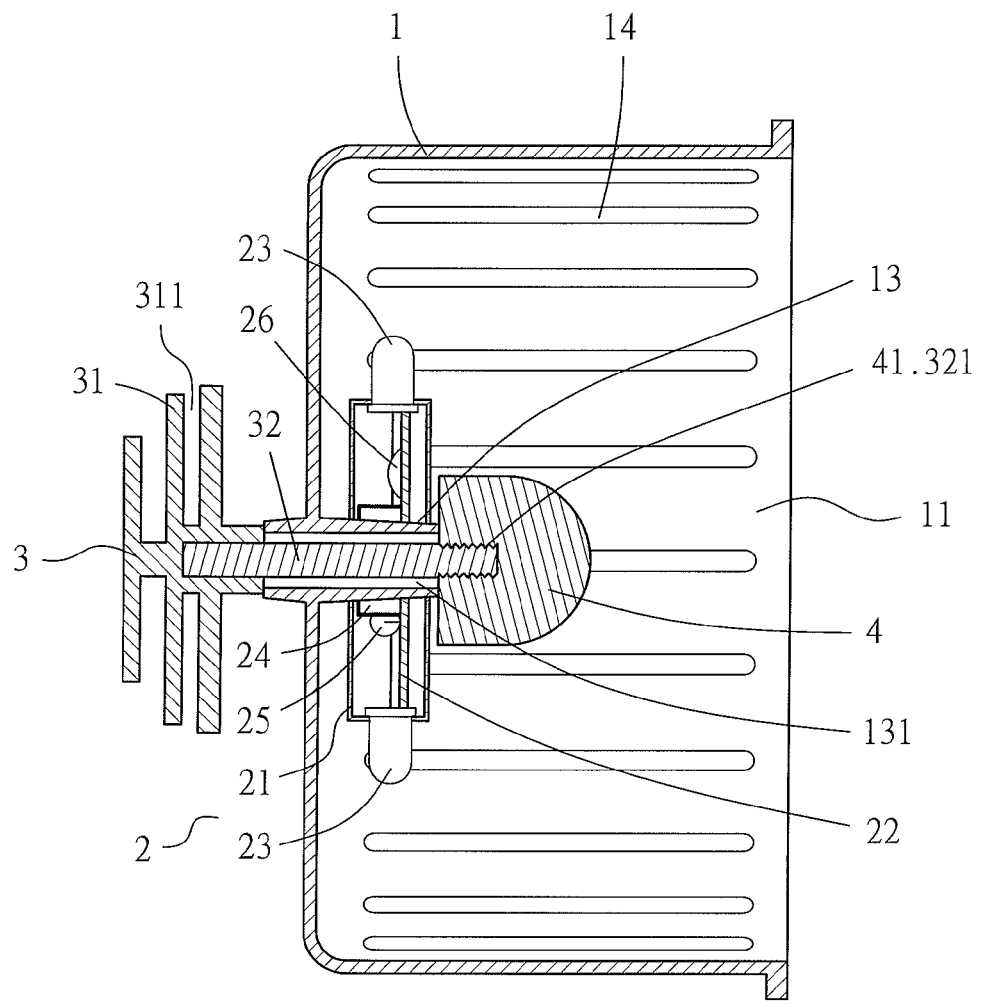
FIG. 3 is a cross-sectional view of the pet exercise wheel assembly according to the present invention.

According to the present invention, a pet exercise wheel assembly having a light-emitting device, as shown in FIGS. 1, 2 and 3, is composed of an exercise wheel 1, a light-emitting device 2, a wheel base 3 and a cover cap 4.

The exercise wheel 1 is made of a material pervious to light. The exercise wheel 1 has one lateral side formed with an opening 11, and an opposite lateral side formed with a plurality of decorative through holes 12. A tapered sleeve 13 axially formed with a penetrating channel 131 projects outward and inward from a center of the exercise wheel 1, and a plurality of ribs 14 are formed on an inner periphery of the exercise wheel 1 for pets to step thereon.

The light-emitting device 2 has outside a casing 21 formed with a central hole 211. A circuit board 22, also formed with a central hole 221, is installed in the casing 21. The circuit board 22 is provided with lamps 23, a battery 24, a rocker switch 25, and an IC chip 26. The IC chip 26 serves to perform delay illumination or extinguishment of the lamps 23. In the present embodiment, the lamps 23 are LED lamps. The rotary switch 25 serves to turn on or off the lamps 23 once each time it is switched. To configure the light-emitting device 2, all the aforementioned components are electrically connected, while the lamps 23 are exposed at an exterior of the casing 21.

The wheel base 3 has one end formed with a fastening portion 31 that has an engaging groove 311, and an opposite end has protrudingly a screw portion 32 having thereon external threads 321.

The cover cap 4 is axially formed with internal threads 41.

Figure 4:
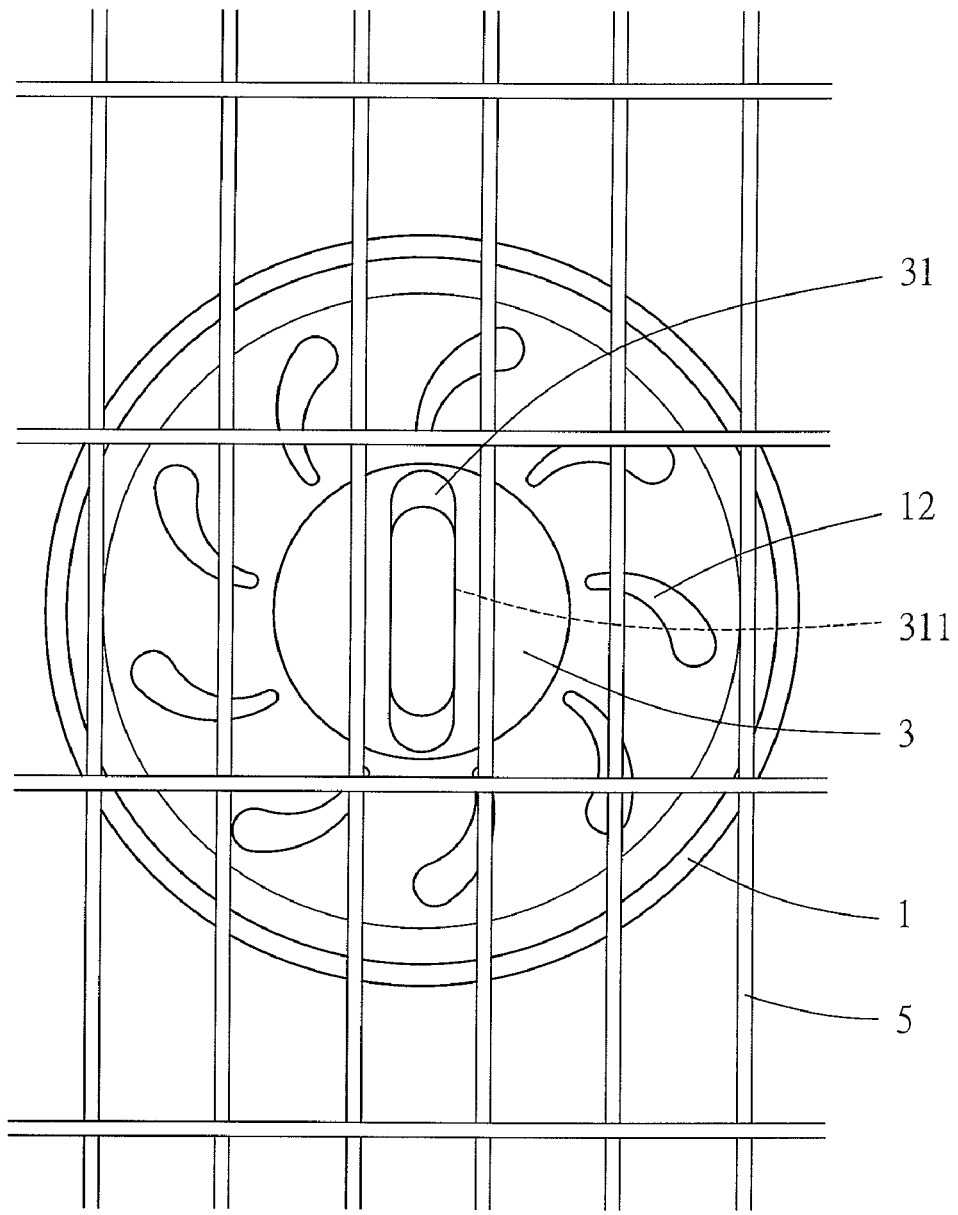
FIGS. 4 and 5 illustrate the combination of the pet exercise wheel assembly of the present invention with a pet cage.
Figure 5:
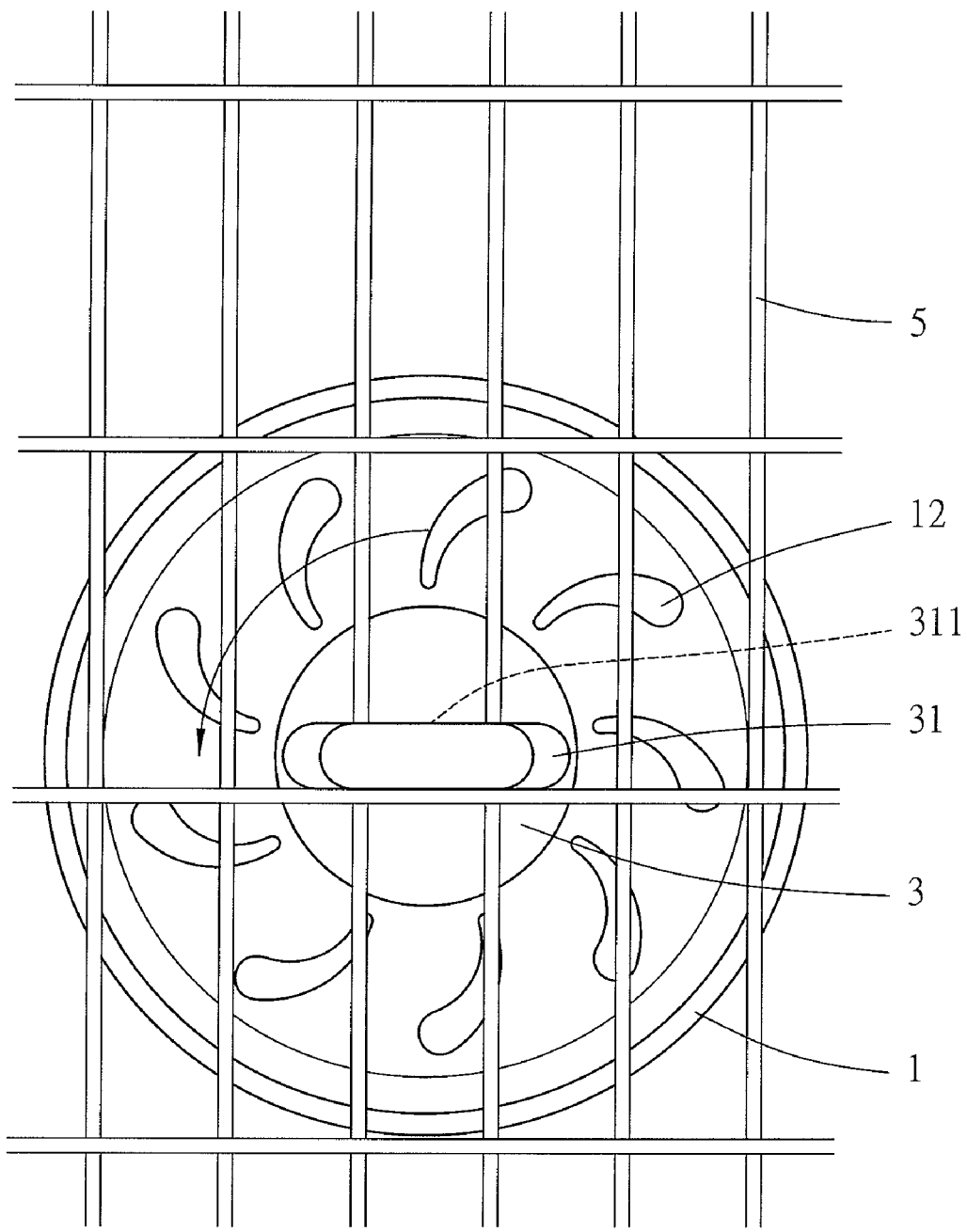

To assemble the pet exercise wheel assembly, the central hole 211 on the casing 21 of the light-emitting device 2 is first pierced by and thus coupled with the tapered sleeve 13 inside the exercise wheel 1, and the screw portion 32 of the wheel base 3 pierces through the penetrating channel 131 of the exercise wheel 1. Then, the cover cap 4 is coupled to the wheel base 3 with their internal threads 41 and external threads 321 engaged mutually, as shown in FIG. 3. Afterward, when the wheel base 3 has the fastening portion 31 thereon put between bars of a pet cage 5 as shown in FIG. 4 and rotated with respect to the bars of the pet cage 5, the engaging groove 311 of the fastening portion 31 can firmly hold the bars, thereby fixing the wheel base 3 to the cage 5, as shown in FIG. 5.

Figure 6:
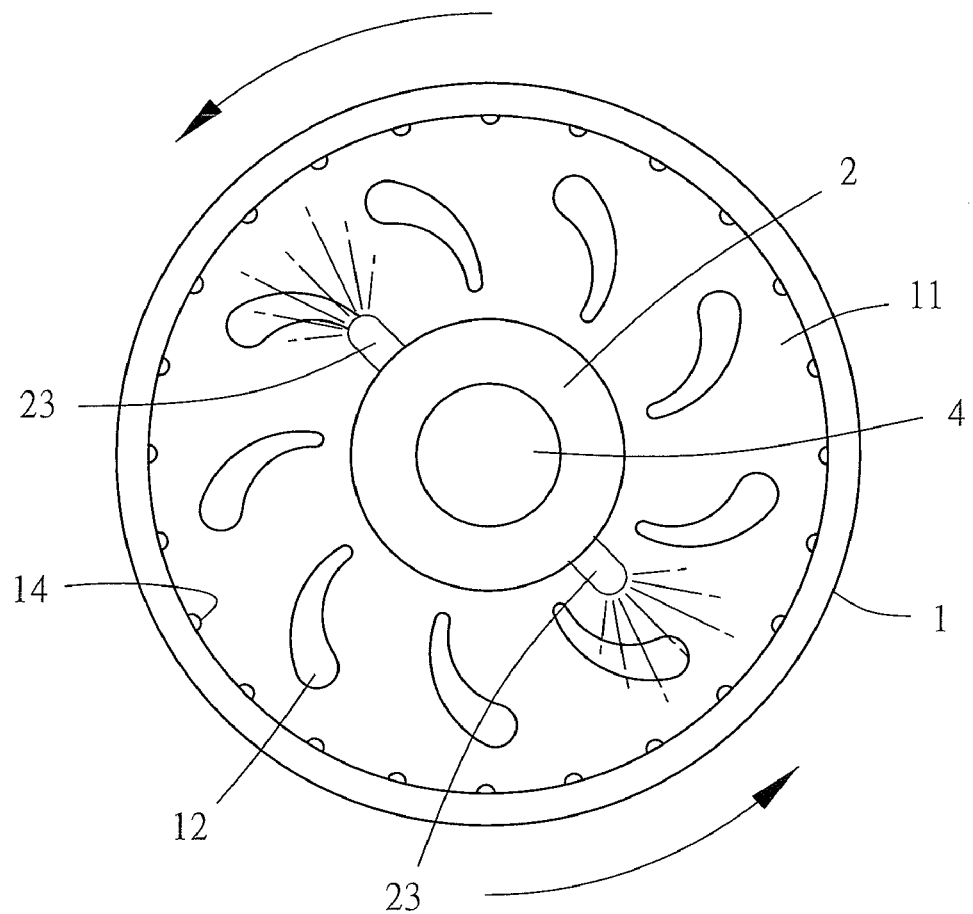
FIGS. 6 and 7 are schematic drawings showing the pet exercise wheel assembly rotating and a light-emitting device therein illuminating.
Figure 7:
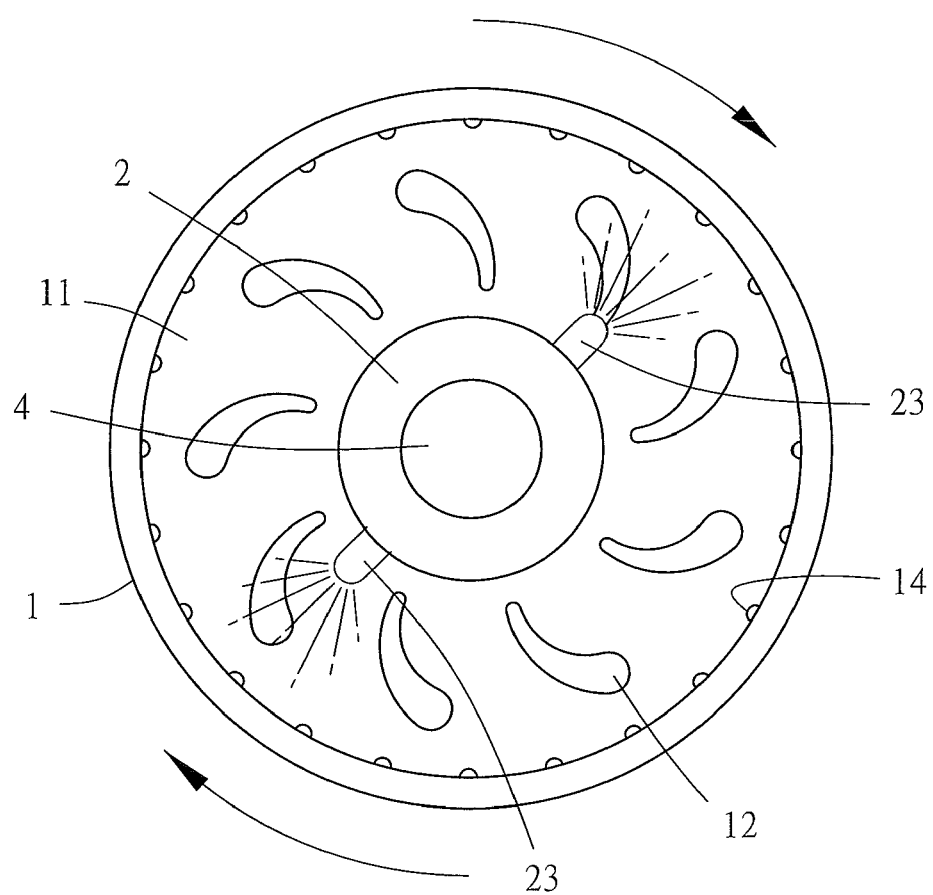
Figure 8:
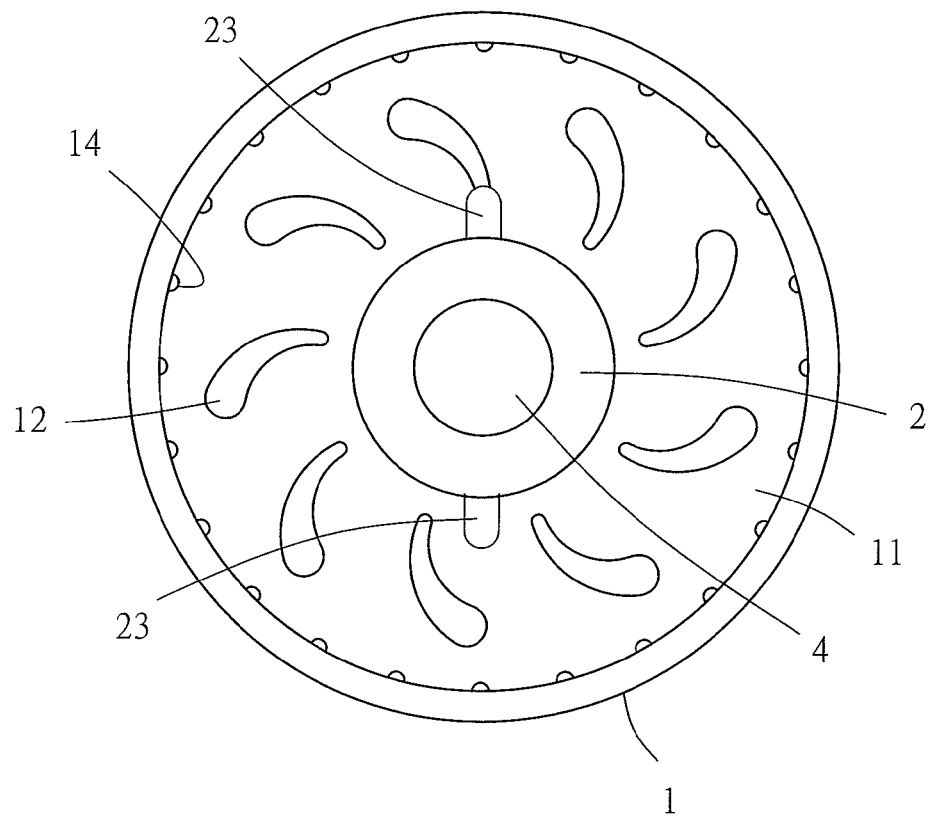
FIG. 8 is a schematic drawing showing the pet exercise wheel assembly left still.

In use, when a pet enters the exercise wheel 1 and runs by stepping on the ribs 14, the exercise wheel 1 is rotated and in turn drives the light-emitting device 2 coupled to its tapered sleeve 13 to rotate together. As a result, the rocker switch 25 in the light-emitting device 2 is rocked and thus closing the loop of the circuit board 22 so that the lamps 23 of the light-emitting device 2 exposed at the exterior of the casing 21 are lit up in an intermittent manner to give a blinking illumination, as shown in FIGS. 6 and 7, thereby providing a glorious visual entertaining effect. When the pet moves off the exercise wheel 1 and leaves the exercise wheel 1 still, the loop is open, and the lamps 23 will not give a blinking illumination, as shown in FIG. 8.

What is claimed is:

1. A pet exercise wheel assembly having a light-emitting device, the pet exercise wheel assembly comprising:
    an exercise wheel made of a material pervious to light, wherein the exercise wheel has an opening formed on a side of the exercise wheel, with a tapered sleeve projecting from a center of the exercise wheel and axially formed with a penetrating channel, and with a plurality of ribs for a pet to step on formed on an inner periphery of the exercise wheel;

a light-emitting device having a casing formed with a central hole for being pierced by and thereby coupled with the tapered sleeve inside the exercise wheel, with a circuit board located in the casing and formed with a central hole also pierced by the tapered sleeve, with the circuit board being provided with at least a lamp, a battery, a rocker switch, and an IC chip that are electrically connected to each other, with the lamp exposed at an exterior of the casing;

a wheel base including a side formed with a fastening portion having an engaging groove for engaging with bars of an external pet cage, and wherein the wheel base has a screw portion for piercing through the penetrating channel of the exercise wheel; and a cover cap coupled with the screw portion pierced through the penetrating channel of the exercise wheel, whereby, the pet stepping on the ribs inside the exercise wheel rotates the exercise wheel and in turn drives the light-emitting device fixed to the tapered sleeve of the exercise wheel to rotate therewith, so that the rocker switch of the light-emitting device is rocked to close a loop of the circuit board, thereby causing the lamp of the light-emitting device to blink.

2. The pet exercise wheel assembly of claim 1, wherein the lamp is an LED lamp.

* * * * *